(12) United States Patent
O'Brien

(10) Patent No.: US 6,500,521 B2
(45) Date of Patent: Dec. 31, 2002

(54) STEPPED ETALON

(75) Inventor: Stephen O'Brien, Lehigh, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/312,386

(22) Filed: May 14, 1999

(65) Prior Publication Data

US 2002/0150728 A1 Oct. 17, 2002

(51) Int. Cl.[7] .................................................. G02B 1/03
(52) U.S. Cl. ...................... 428/156; 428/161; 428/164; 356/454; 359/260; 359/589; 349/198
(58) Field of Search ................................. 428/156, 161, 428/164; 356/352, 361, 454; 359/577, 580, 589, 260; 349/198

(56) References Cited

U.S. PATENT DOCUMENTS

| | | | |
|---|---|---|---|
| 2,769,111 A | * 10/1956 | Sadowsky | .................. 313/92 |
| 4,822,998 A | 4/1989 | Yokota et al. | .............. 250/226 |
| 5,128,798 A | 7/1992 | Bowen et al. | .............. 359/260 |
| 5,144,498 A | 9/1992 | Vincent | ...................... 359/885 |
| 6,323,987 B1 | * 11/2001 | Rinaudo et al. | ............ 359/260 |

* cited by examiner

Primary Examiner—Harold Pyon
Assistant Examiner—Alicia Chevalier

(57) ABSTRACT

An improved stepped etalon comprises a transparent body having a stepped surface. The lands of the steps are separated by a non-abrupt or softened transition region. This reduces the diffraction of light caused by the step transitions, thereby reducing the dead spot behind the step transition portions where interference prevents accurate measurements of light transmission from being made. Methods for producing a smoothly stepped etalon and for smoothing the step transitions in an abruptly stepped etalon are also disclosed.

3 Claims, 9 Drawing Sheets

(AXIS PERPENDICULAR TO STEP)

STEPPED ETALON

TECHNICAL FIELD

This invention is related to an improved multi-wavelength stepped etalon.

BACKGROUND OF THE INVENTION

In many applications, it is necessary to accurately determine the wavelength(s) of light incident on a suitable detector. A widely used type of detector includes an etalon to filter specific frequencies of light. An etalon is a type of interference filter in which the intensity of transmitted light is dependent on its wavelength. In a conventional design, an etalon is comprised of two partially reflective parallel surfaces a distance d apart and separated by a material with an index of refraction r. When collimated light having a wavelength $\lambda$ is passed through the etalon, some of the light is reflected from the surfaces. The multiply reflected light beams interfere, either constructively or destructively, with each other, and thus alter the overall intensity of the light which passes through the etalon 10. Maximum transmission occurs when twice the distance between the reflective surfaces 12, 14 is an integral number of wavelengths $\lambda$ in the etalon. In other words, $2d*r/\lambda=x$, where x is an integer.

Often, it is desirable to provide a sensor which is sensitive to, and can discriminate among, several different frequencies of incident light at the same time. Such a sensor is particular useful for spectrographic analysis. Although several discrete etalons can be utilized for this purpose, in some implementations, a stepped etalon is used instead. In this arrangement, one or both active surfaces of the etalon are stepped so that each step on the etalon provides a region of different thickness. By adjusting the thicknesses appropriately, each step can be configured to pass different frequencies of light. Stepped spectrographic etalon arrangements of this type are shown in U.S. Pat. No. 4,822,998 to Yokota et al. and U.S. Pat. No. 5,144,498 to Vincent.

A newly developed application is the use of a specifically configured stepped etalon to tune the output frequency of a laser. For fiber optic communications in particular, accurate tuning of the communication lasers is necessary to permit adjacent transmission channels to be closely spaced, often at wavelengths differing by only 0.4 nanometers or less. For such closely spaced channels, a laser's wavelength must be tuned to the assigned channel with an accuracy of +/−0.1 nanometers or less. Although only a single wavelength of light needs to be detected to tune such a laser, at these high accuracies, thermal variations in the thickness of an etalon and slight variations in the angle of applied light from normal to the etalon surface can shift the light transfer function an unacceptable degree.

According to the new application, the nominal thickness of the etalon can be chosen so that the periodicity of the etalon filter roughly matches the periodicity of a data communication channel spacing, i.e., 1500.12, 1550.52 nm for a system with a channel separation of substantially 0.4 nm. Two or more steps are formed on one side of the etalon. The step size is selected to be a fraction of the channel separation, on the order of 0.1 nm, and is substantially optimized so that a peak or trough in the transmission curve in the region of one step overlaps a steep portion of the transmission curve for one or more other steps. In this manner, as thermal changes in the etalon shift the transmission curve for one step beyond the desired range, the curve for a second step is shifted into the desired frequency. By selecting a particular step according to a measured temperature and etalon calibration information, and measuring the intensity of laser light transmitted through the selected step of the etalon, a feedback signal is provided which can be used to adjust the output wavelength of the laser. Similarly, different steps can be selected to compensate for tolerance errors in the angle of light incident the etalon. This configuration is more fully described in a co-pending patent application entitled "Controlled Multi-wavelength Etalon," filed concurrently with the present application and assigned to Lucent Technologies, Inc., and the entire contents of which is hereby incorporated by reference.

With reference to FIG. 1a, in both types of stepped etalon configurations, the stepped etalon 10 having partially reflective coatings 11a, 11b, is positioned adjacent an appropriately configured array of photodetectors 14a, 14b, where each detector is aligned with a corresponding etalon step 12a, 12b. When a beam of light 16 is directed onto the etalon 10, the intensity of the output signal attributed to each detector 14a, 14b indicates the intensity of light passing through the etalon in the region of the corresponding step, therefore providing a measure of the intensity of incident light, with the particular frequencies determined by the thickness of the etalon in that region.

A significant drawback to a conventional stepped etalon is the interference caused by the abrupt transition between the lands of adjacent steps. When no step is present, the intensity within a collimated light beam transmitted through an etalon has the same intensity pattern as the incident beam, typically gaussian-like as shown in FIG. 1b. However, when an abrupt step is present, the incident and resonant light is diffracted, producing interference within the transmitted beam along the axis perpendicular to the step edge. The resulting fringe pattern is illustrated in FIG. 1c. The result of the diffraction is that in the vicinity of the step, there is substantial angular dispersion of the light which reduces the quality of the transmission function resulting in reduced signal amplitude, broadened peaks, as well as reduced ability.

Such an reduction in wavelength discrimination is illustrated in FIG. 1d for a two step etalon. Curves A1–A5 are measured on step A and curves B1–B5 are measured on step B. Curves A1 and B1 represent positions distant from the step transition. The remaining curves A2–A5 and B2–B5 are measurements made at locations progressively closer to the step transition. The input signal was provided by a temperature tuned laser and therefore increases in temperature represent increases in input signal wavelength. As indicated, the peaks and troughs for curves close to the step transition lower and less defined than those measured far from the step transition, indicating that near the step transition, it is harder to discriminate between wavelengths that are close to each other.

The effect of the interference and overall reduction in etalon quality associated with abrupt steps creates a "dead spot" behind and near the step edge in which accurate intensity readings are compromised. Thus, there are portions of the etalon where a detector cannot be placed due to the reduced quality of the transmitted beam.

For example, experiments using an etalon with a thickness of approximately 2 mm and a step height of approximately 0.2 um reveal a "dead spot" approximately 600 to 800 um wide directly behind the step. Since input beam widths of between 0.5 to 5.0 mm are common, a significant portion of the transmitted beam will not have high quality etalon transmission characteristics and thus will not be suitable for detection. This reduces the available optical power for measurement and lowers the power-per-detector. Since a minimum signal-to-noise ratio is required for reliable measurements, decreasing the power-per-detector thus can decrease the accuracy of the detector and the stability of equipment which is adjusted according to the etalon measurements. The interference also limits the number of possible steps which can be placed on an etalon of a given size.

Although the size of the etalon can be increased to provide more area within each step land which is distant from the edge, this is often an undesirable solution. First, the detector array is commonly formed on an integrated circuit which may not be as easily increased in size without a relatively large increase in production cost. Second, the width of the input light beam itself may not be variable and increasing the etalon width will introduce the additional problems of directing the beam to the desired portion of the etalon.

SUMMARY OF THE INVENTION

According to the invention, a stepped etalon is formed where the transition between the lands of adjacent steps is "softened" or smoothed, i.e., non-abrupt, to thereby reduce diffraction banding, fringing, and other optical effects caused by the presence of sharp transition regions. Such softened or smoothed step transitions can be produced in several ways.

During the step fabrication process, the etalon steps can be formed by a directional "abrasive" etching process, such as reactive ion etching. The etching beam is applied to the etalon at an angle relative to the surface to be etched. The transition region between the resulting steps will have an angle substantially equal to the etch angle. Alternative fabrication techniques, such as the use of an erodible photoresist mask in the region of the step transition, can also be used to produce a softer edge.

Alternatively, preexisting abrupt or "hard" step transitions can be softened by post-processing techniques. In one method, the entire stepped surface of the etalon 30 is chemically etched. Because of the greater surface area and increased stresses associated with the step sharp corners, the corners will etch at a faster rate than the flat step lands, producing a softened transition region. Alternatively, the stepped region can be coated with a spin-on glass or other material, such as glass-laden epoxy, etc., which has an index of refraction similar to that of the etalon. The spin-on material forms a thin coating on the tops of the steps and a thicker coating in the step transitions regions. The coating thus fills in the abrupt inner corners and rounds the outer corners. In yet another alternative, the etalon is selectively annealed. Selective application of sufficient heat in the regions of the step transition to produce localized melting will produce a softened transition edge as the melted etalon glass flows and resolidifies.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENT(S)

According to the invention, a stepped etalon is provided in which the transition region between the lands of adjacent steps is not abrupt, but is instead "softened" or generally smoothed so as to reduce diffraction banding, fringing, and other optical effects caused by the presence of sharp transition regions. Softened or smoothed step transitions according to the invention can be produced in several ways, as are described below. Once steps with softened transition regions are formed, the stepped surface and the parallel opposing surface of the etalon are polished, if needed, to produce optically flat surfaces, and a partially reflective coating is applied, using techniques known to those of skill in the art, to form the completed etalon. Particular techniques for fabricating softened step etalons according to the invention are discussed below. It should be noted that while etalons having only two steps are discussed, the invention can be applied to etalons having any number of steps.

Figure 1A:
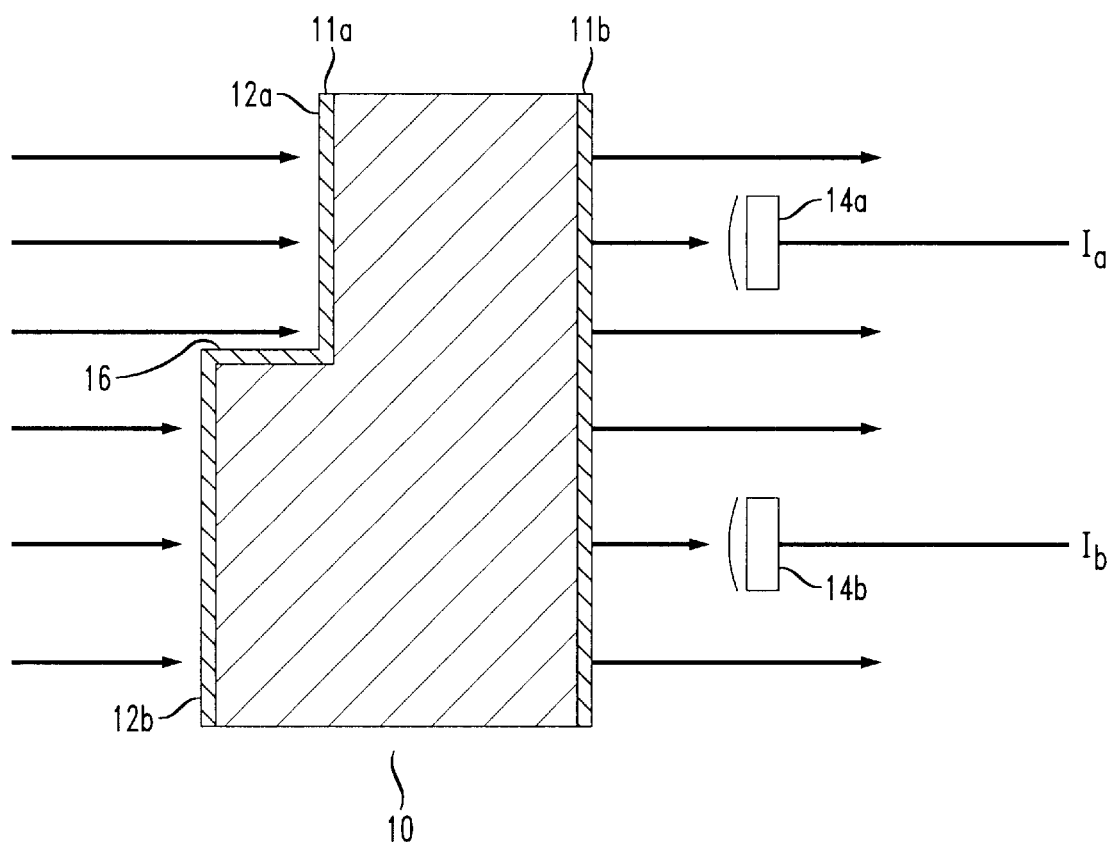
FIG. 1a is a representation of a conventional stepped etalon.
Figure 1B:
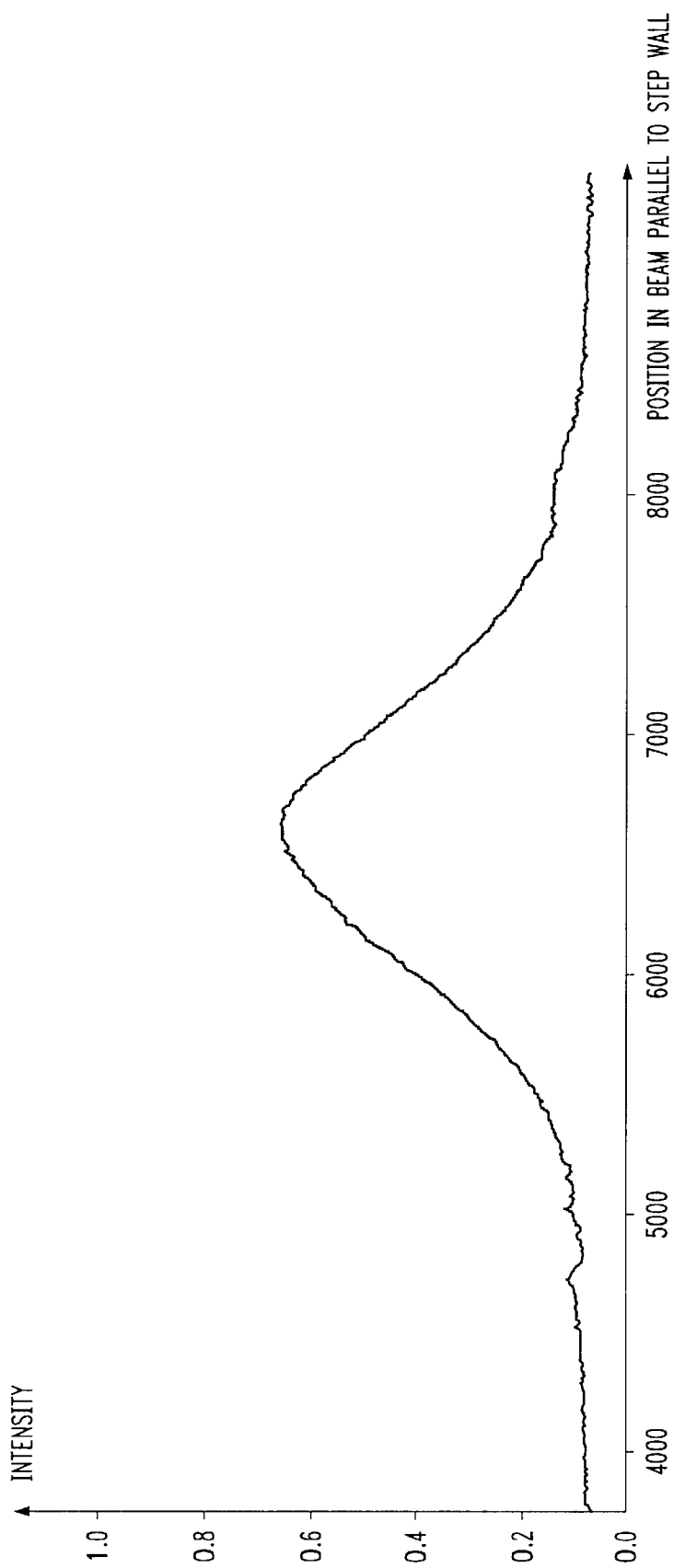
FIG. 1b is a graph of the intensity of a light beam transmitted by an unstepped etalon.
Figure 1C:
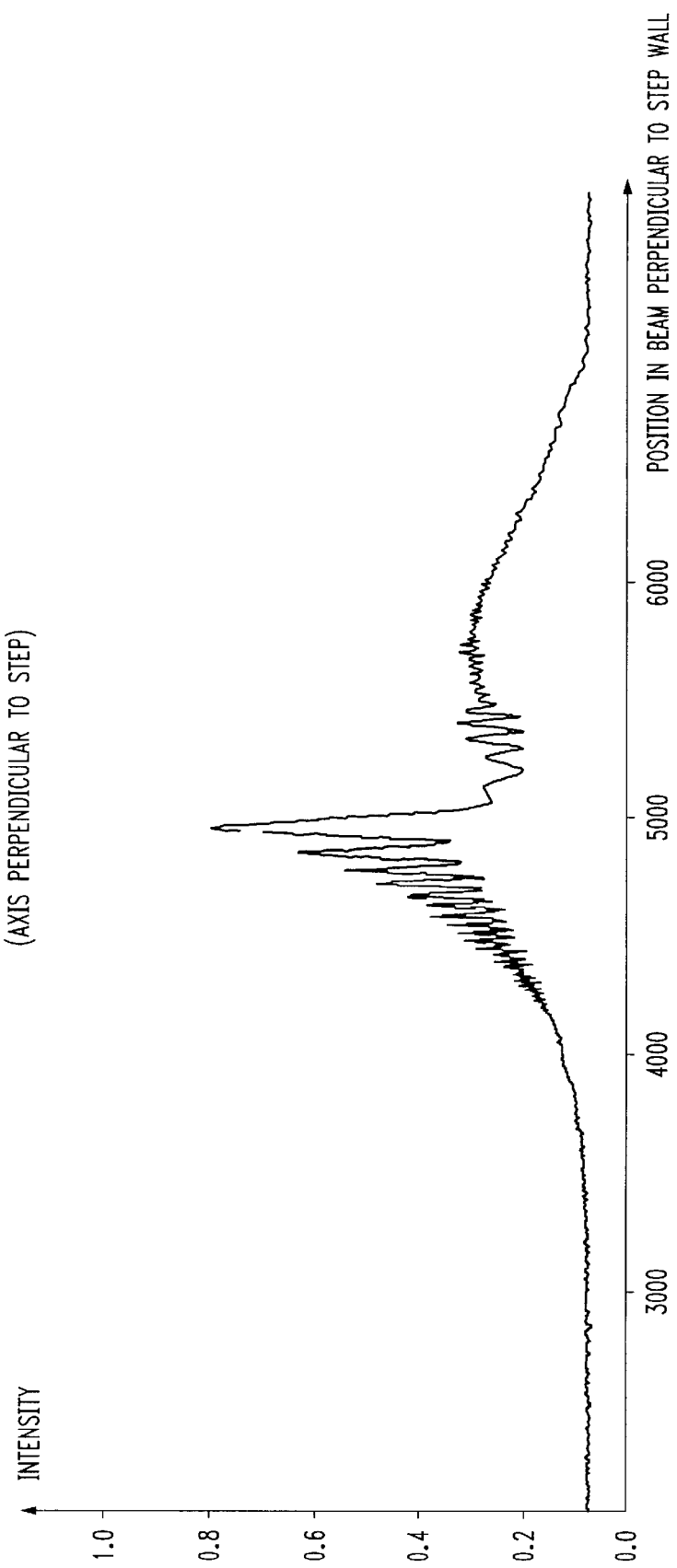
FIG. 1c is a graph of the intensity of a light beam transmitted by a stepped etalon and passing through the step transition region.
Figure 1D:
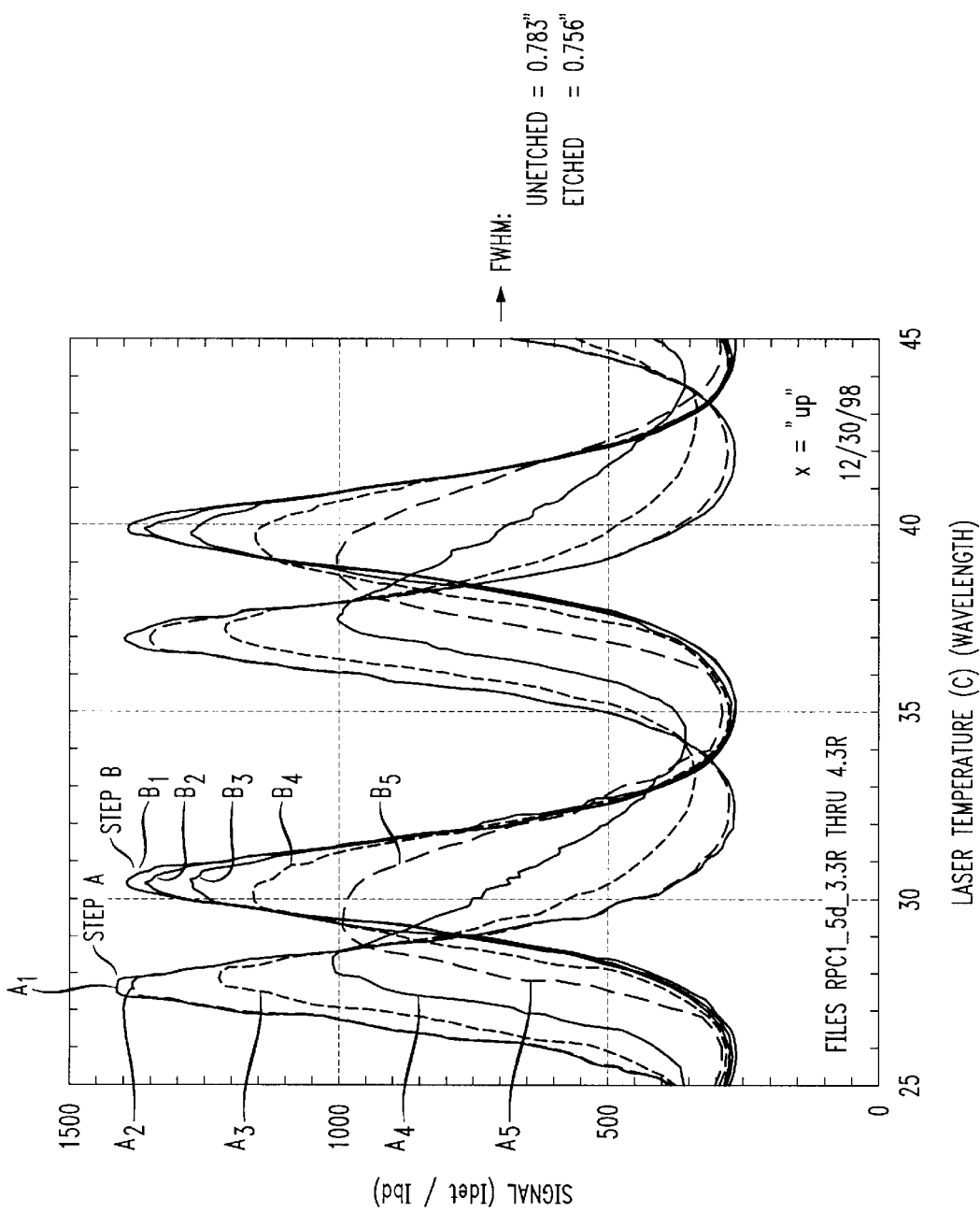
FIG. 1d is a graph of the intensity of light beams transmitted by a stepped etalon measured at different lateral distances from the step.
Figure 2A:
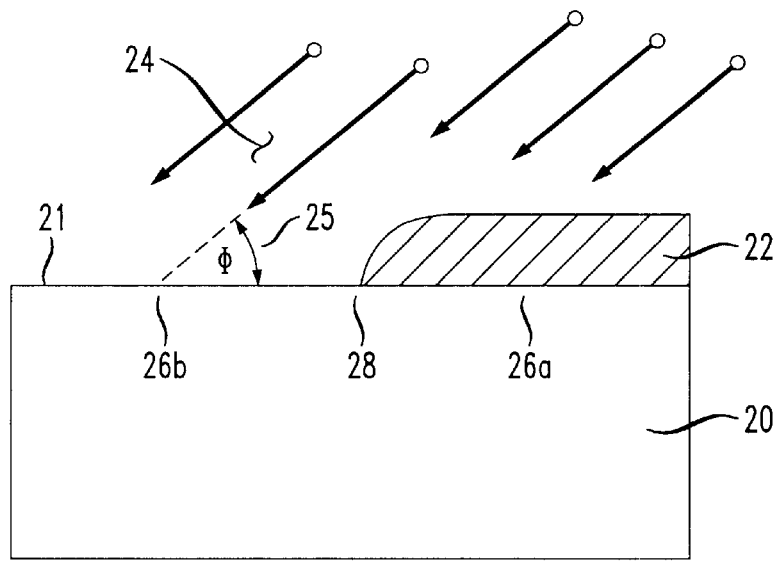
FIGS. 2a and 2b illustrate the production of a softened step etalon by directed etching.

According to a first embodiment of the invention, softened transition etalon steps are directly formed in an etalon blank. In one technique, a directional "abrasive" etching process, such as reactive ion etching is used. FIG. 2a illustrates an etalon "blank" 20 comprised of a light transmitting material, such as $SiO_2$ glass. The blank 20 has a top surface 21 into which one or more steps are to be formed. A portion 26a of the surface 21 corresponding to the land of the highest step is coated with a layer of masking material 22, such as an appropriate photoresist or sacrificial material. A directed etching beam 24 is then applied to the etalon blank 20. According to an embodiment of the invention, the beam 24 is not applied normal to the surface 21, but instead is applied at an angle 25 which is less than 90° relative to the surface 21.

The portion 26a of the etalon surface 21 covered by the coating 22 is preserved. However, the exposed portion 26b of the surface 22 is etched. The etching depth depends on several factors, including the composition of the blank 20, the characteristics of the directed etching beam 24, and the duration of the etching process. Once the surface portion 26b is etched to the desired depth, the coating 22 is removed. Various techniques for coating and directional etching of an etalon blank will be known to those of skill in the art.

Because the etching beam 24 is applied at an angle, the transition region 28 between the two steps is also angled. As can be appreciated, the angle of the transition region 28 between the protected portion 26a and the etched portion 26b will depend on the angle at which the etching beam 24 is applied. The smaller the angle, the less abrupt is the transition between the steps. However, as the angle is reduced, the width of the transition region 28 increases.

Thus, the abruptness of the transition region is balanced with an increase in its width. According to the invention, the angle is selected to provide a non-abrupt transition region, i.e., resulting from a step transition having an angle less than approximately 75°. In one embodiment, the angle is significantly less, preferably to provide a transition region which is between about 0.5 to 3 times the step height.

For example, an etalon with an abrupt step and having a height of approximately 2.0 um has a dead zone on the order of 600 to 800 um wide. A performance improvement can be obtained with a sloped transition region of width preferably up to about 400 um wide. Most preferably, for this step configuration, the width of the transition region is between about 50 um and about 400 um. To produce a transition region of this width, the etching beam is applied at a very shallow angle of between approximately 7° and 0.30°.

In another embodiment, providing a shorter non-abrupt transition region, the angle is preferably selected to be substantially equal to Brewster's angle (the angle at which all of the reflected ray is polarized) for the etalon material. For glass, this angle is approximately 38°. However, narrower or significantly broader transition regions may be appropriate under various circumstances.

According to another technique, softened transition steps are directly formed on an etalon blank by use of an erodible photoresist mask. Unlike traditional photoresist masking materials, an erodible mask is designed to erode at a known rate in a given etching environment. After the mask has eroded, erosion of the underlying substrate beings. By varying the thickness of the erodible mask, different areas of the substrate will be exposed to the etching environment at different times, and thus will be etched to different depths. The composition of the erodible mask is depending on the particular etching environment at issue and appropriate compositions will be known to those of skill in the art. In addition, various techniques are available for applying such an erodible mask, as will also be known to those of skill in the art.

For example, the resist can be applied with a "hard" edge and then reflowed after patterning by, e.g., melting the resist or softening it with appropriate chemical agents. Generally, surface tension will provide for a softened edge in the form of a resist "tail" which extends past the masked edge approximately as far as the resist is high. To provide a longer tail, the resist can be applied using "grey scale" printing techniques, wherein the edge of the resist is not abrupt, but instead is formed of a collection of resist "dots", spots, or other broken regions which become smaller and/or more widely spaced al distances further from the solid edge of the resist. The dots are configured such that the masking density, i.e., the average percentage of the etalon surface which is covered by the resist, drops across the transition region 28 from 100% over region 26a to 0% over region 26b. After application, the grey scale resist dots can be reflowed to provide a solid resist layer with gradually reducing varying thicknesses, such as shown in FIG. 3a.

Figure 3A:
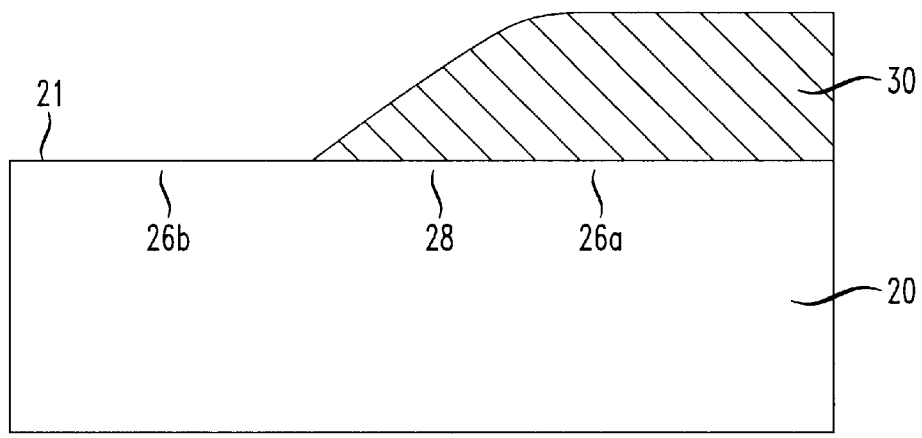
FIGS. 3a and 3b illustrate the production of a softened step etalon by use of an erodible mask.

FIG. 3a illustrates an etalon blank 20 having an erodible resist mask 30 applied over portion 26a of the etalon surface 21. The thickness of the mask 30 over portion 26a is preferably sufficient to survive the etching process. As illustrated, the mask thickness is reduced over the transition region 28 so that the mask has a sloped edge. When the etalon 20 is placed in a suitable etching environment, the exposed portion 26b will begin to erode immediately. The transition region 28 will begin to erode as the overlying sloped mask erodes away and progressively exposes more of the underlying transition region.

Figure 2B:
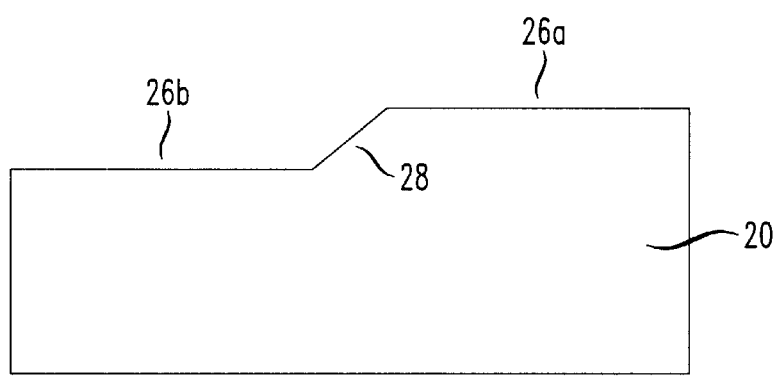
Figure 3B:
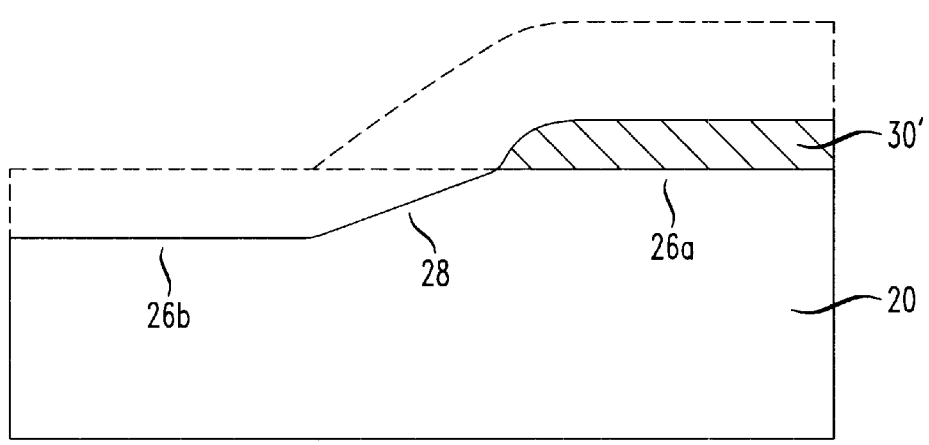

FIG. 3b illustrates the etalon 20 after etching, with the original surface 21 and mask area illustrated in broken line. As shown, the transition region 28 has a profile which corresponds generally to that of the original erodible mask 30. The remaining (non-eroded) portion of the mask 30' is then removed to provide an etalon similar to that shown in FIG. 2b.

Figure 4A:
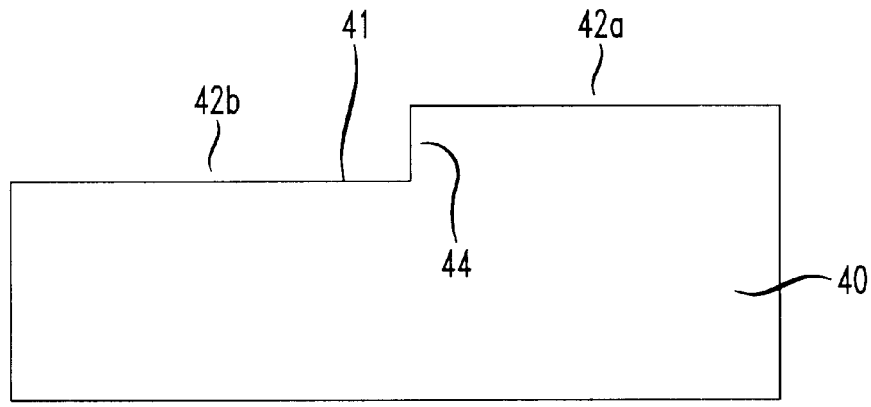
FIG. 4a is an illustration of a partially fabricated etalon having abrupt step transitions.

Another embodiment of the invention begins with a partially fabricated conventional stepped etalon 40, such as shown in FIG. 4a. Surface 41 of the etalon 40 has step lands 42a and 42b which are separated by an abrupt transition region 44. Additional processing steps are applied to etalon blank to soften the transition region 44 between the steps.

Figure 4B:
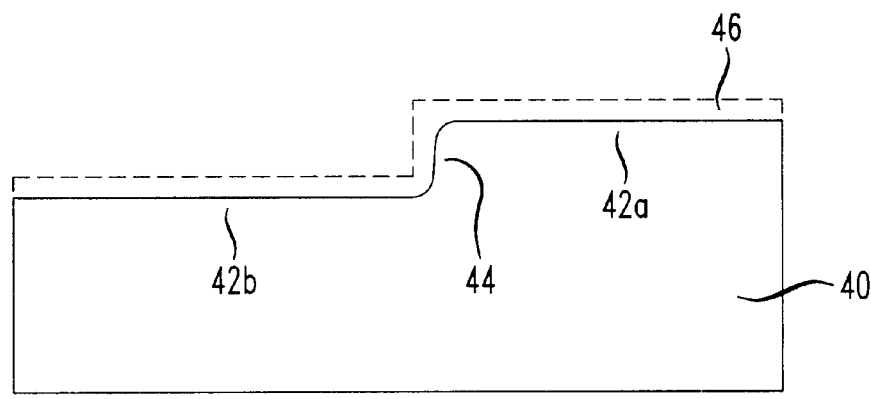
FIGS. 4b–4f illustrate methods of processing the etalon of FIG. 4a to provide softened step transitions.

In a first method for this embodiment, the entire stepped surface 41 of the etalon 40 is chemically etched with an appropriate etchant, such as buffered hydrofluoric acid. Although the entire exposed surface of the etalon will be etched to some degree, the corners will etch at a faster rate than the flat step lands because there are increased material stresses associated with sharp step corners and also because the corners have a greater surface area exposed to the etching environment. The difference in etching rates softens the transition region. FIG. 4b illustrates etalon 40 after such a chemical etching process has been applied. The material 46 removed by the additional etching is illustrated in broken lines.

Figure 4C:
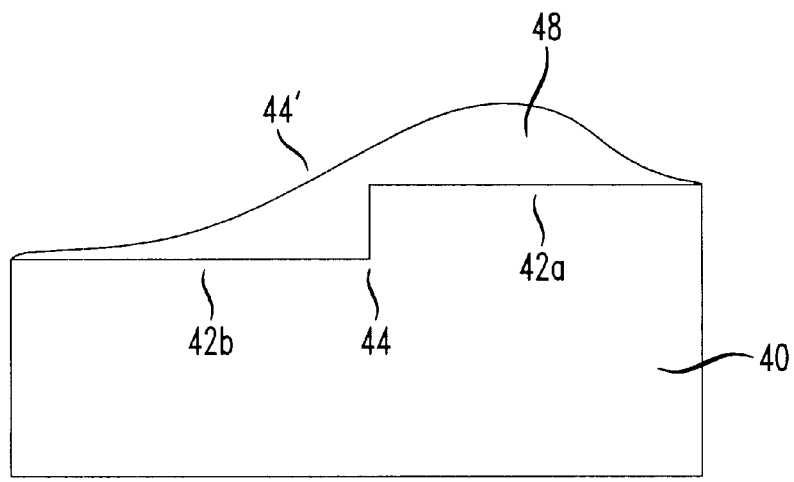
Figure 4D:
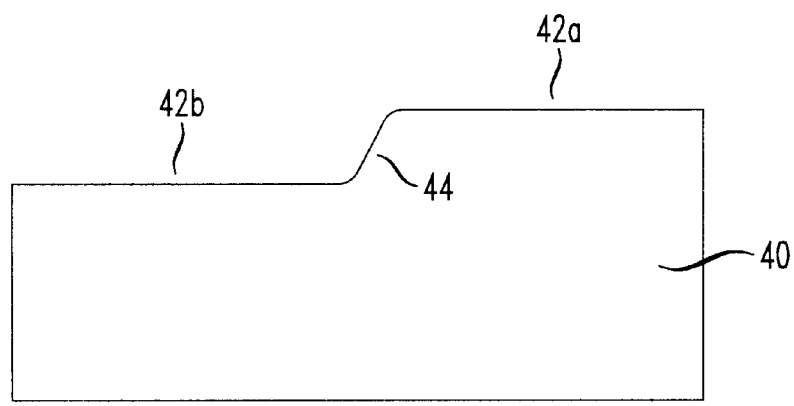

In a second method, the surface 41 of the stepped etalon 40 is coated with a spin on glass or other material, such as glass-laden epoxy, etc. Preferably, the coating has an index of refraction substantially equal to that of the etalon to avoid producing undesired diffraction at other places in the etalon. Various suitable coating materials will be known to those of skill in the art. An etalon 40 having such an applied additional layer 48 is shown in FIG. 4c. The spin-on material forms a thin coating on the majority of tops of the step lands 42a, 42b and a thicker coating in the step transitions region 44 and possibly adjacent areas of the step lands 42a, 42b. The thicker coating in the transition region 44 fills in the abrupt inner corners ADD NUMBERS TO FIG. 44A, 44B and rounds the outer corners and provides a softened transition 44'. If the coating does not cover the entire step lands, the application is preferably made in a manner which produces a smooth transition between the edge of the coating and the uncoated etalon surface to thereby avoid the introduction of additional steps on the etalon surface.

Figure 4E:
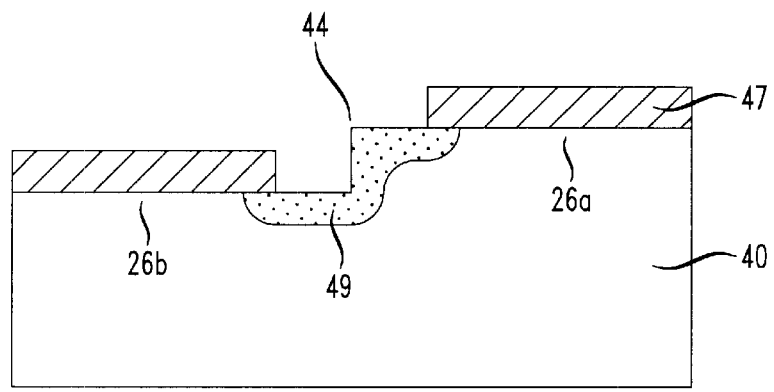
Figure 4F:
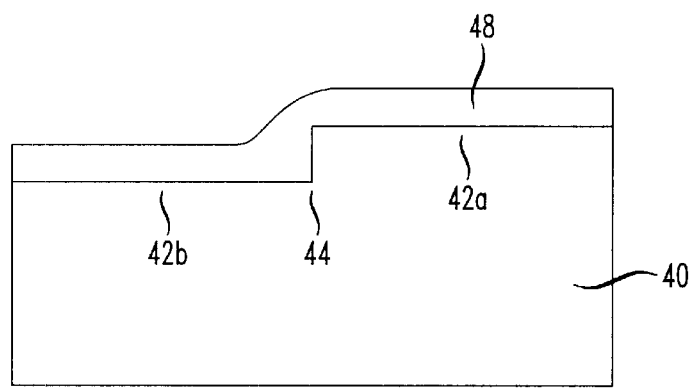

In a variant of the spin-on method, the coating 48 can be deposited across the entire surface of the etalon using, e.g., plasma or epitaxial growth processes as shown in FIG. 4f. In such an arrangement the coating can be of the same composition as the etalon since it does not need to flow, as is generally a requirement for spin-on application. For example, a layer of $SiO_2$ can be deposited on top of a etalon comprised substantially of $SiO_2$.

In yet another alternative, the partially processed stepped etalon 40 is selectively annealed. In particular, heat sufficient to produced localized melting is selectively applied to the step transition regions. The localized melting produces a softened transition edge as the melted etalon glass flows and then resolidifies. Various techniques for selective annealing will be known to those of skill in the art, and include application of heat via directed laser beams. In one embodiment, two or more laser beams are directed at the etalon so that they intersect at the transition region. The beam intensity is selected to that no single beam is of sufficient intensity to melt the etalon material, but that the combination of the beams introduces sufficient heat to produced localized melting where the beams intersect.

In a further embodiment, illustrated in FIG. 4e, the etalon 40 is treated not to reduce the abrupt transition between the steps, step, but instead to reduce the effect of abrupt transition. This is accomplished by masking the etalon surfaces 26a, 26b with a suitable material 47 while leaving the step transition region 44 exposed and then doping the etalon in the region of the step transition 44 with a dopant which absorbs the light in the frequency range of interest. Because of the mask 47, the dopant will only be implanted in a small region 49 surrounding the transition region 44.

The dopant absorbs light that would otherwise be defracted, thus reducing the interference caused by an abrupt step. The dopant is implanted in a controlled manner which produces a non-abrupt doping gradient. There are many ways in which to produce such a gradual doping transition which will be known to those of skill in the art. This technique is particularly useful for fabrication of etalons which are to be used with generally monochromatic light, such as etalons used to tune lasers.

For example, in a stepped etalon which is used to detect light energy having a wavelength of approximately 980 nm and the appropriate glass composition, an erbium dopant could be used. Other dopants can be used, depending on the frequencies of light to be applied to the etalon and the etalon material. In addition, a combination of various dopants can be used to absorb a variety of different light frequencies.

Figure 5:
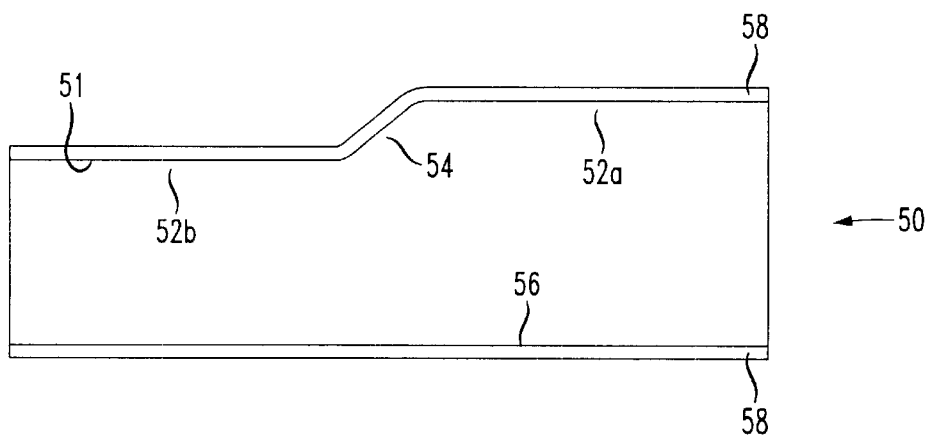
FIG. 5 is an illustration of a softened stepped etalon according to the invention.

As discussed above, once a stepped etalon having softened step transitions is produced, the stepped surface of the etalon and the surface opposing the steps is polished, if needed, to an optical flatness. Then, a partially reflecting coating is applied to the stepped and opposing surfaces using materials and techniques known to those of skill in the art. Such a softened step etalon 50 is illustrated in FIG. 5. As shown, the etalon 50 has an upper surface 51 comprising step lands 52a and 52b separated by a softened transition region 54. The etalon 50 has an opposing surface 56 which is preferably parallel to the step lands 52a, 52b. A partially reflective coating 58 covers surfaces 51 and 56.

Because the transition region 54 between the steps is not abrupt, the optical interference produced by the step transition is reduced when compared to etalons having abrupt step transitions. This advantageously allows a greater portion of the light transmitted in the region of the steps to be used when determining transmitted light intensity, thereby providing a more sensitive device. Alternatively, for a given sensor size, the size of the etalon can be reduced. Other advantages will also be recognized by those of skill in the art.

While the invention has been particularly shown and described with reference to preferred embodiments thereof, it will be understood by those skilled in the art that various changes in form and details may be made therein without departing from the spirit and scope of the invention. In particular, the various processing steps disclosed above do not need to be used in isolation, but instead can be combined as desired. For example, an etalon can be fabricated using directed etching as shown in FIG. 2a and the resulting softened stepped etalon, shown in FIG. 2b, and then a spin-on glass coating can be applied, such as illustrated in FIG. 4, to further soften the transition. Other combinations of processing steps are also possible.

I claim:

1. A stepped etalon comprising:

a body which is transparent at least in a predetermined range of wavelengths and having first and second opposing sides each of which has a partially reflective coating;

the first side being a flat surface;

the second side having a plurality of steps, each step having a flat land substantially parallel to said first side flat surface, and a transition region that slopes downwardly from a said flat land at an angle relative to said land and at an acute angle relative to a line transverse to said first side flat surface separating the lands of adjacent steps.

2. A stepped etalon comprising:

a body which is transparent at least in a predetermined range of wavelengths and having first and second opposing sides;

the first side being a flat surface;

the second side having a plurality of steps, each step having a flat land substantially parallel to said first side surface, a transition region of said second side separating the lands of adjacent steps; and a coating substantially transparent to light having a wavelength within said predetermined range applied over said steps and over said transition regions to make the transition region between lands of adjacent steps slope downwardly from a said flat land at an acute angle relative to a line transverse to said first side flat surface.

3. The stepped etalon of claim 2, wherein:

said body has a predetermined index of refraction;

said coating has an index of refraction substantially equal to said predetermined index of refraction.

* * * * *